(12) United States Patent
Cryan et al.

(10) Patent No.: US 6,450,701 B1
(45) Date of Patent: Sep. 17, 2002

(54) TRANSFORMING OPTICAL FIBER INTERCONNECT ARRAY

(75) Inventors: Colm V. Cryan, Charlton; Richard Strack, Sturbridge, both of MA (US)

(73) Assignee: Schott Optovance, Inc., Southbridge, MA (US)

( * ) Notice: Subject to any disclaimer, the term of this patent is extended or adjusted under 35 U.S.C. 154(b) by 0 days.

(21) Appl. No.: 09/854,965

(22) Filed: May 14, 2001

(51) Int. Cl.[7] .............................. G02B 6/36; G02B 6/06; G02B 6/00
(52) U.S. Cl. .......................... 385/89; 385/116; 385/139
(58) Field of Search ..................... 385/88–94, 116–121, 385/136–139, 146, 147, 52, 54, 95, 96, 115

(56) References Cited

U.S. PATENT DOCUMENTS

| | | | |
|---|---|---|---|
| 3,402,000 A | 9/1968 | Crawford | 385/116 |
| 3,853,658 A | 12/1974 | Ney | 156/180 |
| 4,601,537 A * | 7/1986 | Saccocio | 385/115 |
| 4,911,524 A | 3/1990 | Polaert | 385/116 |
| 4,952,022 A * | 8/1990 | Genovese | 385/116 |
| 5,381,502 A | 1/1995 | Veligdan | 385/120 |
| 5,572,034 A | 11/1996 | Karellas | 250/368 |
| 5,600,751 A * | 2/1997 | Peli | 385/116 |
| 5,655,043 A | 8/1997 | Davies et al. | 385/119 |
| 5,675,685 A | 10/1997 | Fukuda et al. | 385/89 |
| 5,684,905 A | 11/1997 | Sugawara et al. | 385/120 |
| 5,684,906 A | 11/1997 | Sugawara | 385/120 |
| 5,696,865 A | 12/1997 | Beeson et al. | 385/146 |
| 5,774,608 A | 6/1998 | Allen et al. | 385/39 |
| 6,011,885 A | 1/2000 | Dempewolf et al. | 385/34 |
| 6,012,816 A | 1/2000 | Beiser | 353/122 |
| 6,023,548 A | 2/2000 | Heise et al. | 385/120 |
| 6,137,929 A * | 10/2000 | Rosenberg et al. | 385/31 |
| 6,318,909 B1 * | 11/2001 | Giboney et al. | 385/90 |
| 2002/0025125 A1 * | 2/2002 | Willaims | 385/92 |
| 2002/0034363 A1 * | 3/2002 | Wickman et al. | 385/88 |

FOREIGN PATENT DOCUMENTS

EP  1028338 A2  8/2000  ............ G02B/6/42

* cited by examiner

Primary Examiner—Brian Healy
Assistant Examiner—Kevin S Wood
(74) Attorney, Agent, or Firm—Volpe and Koenig, PC

(57) ABSTRACT

An optical interconnection member for interconnecting at least one optical fiber with a data processing unit. The interconnection member comprises an optical, electrical conversion device, an optical transformation array and an adapter. The conversion device is mounted in operable alignment with the data processing unit and the adapter is adapted to receive the connector. The optical transformation array defines an optical transmission medium between non-parallel input and output surfaces whereby the connector and the data processing unit can be interconnected in a non-perpendicular manner.

13 Claims, 3 Drawing Sheets

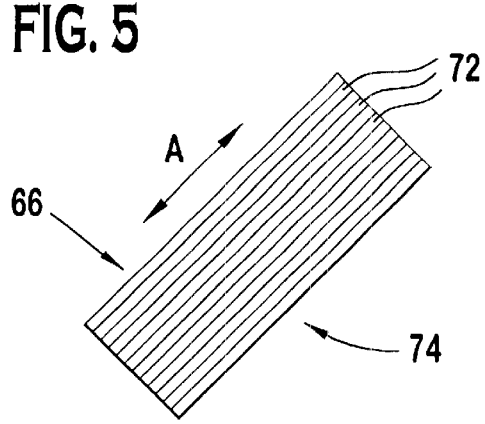
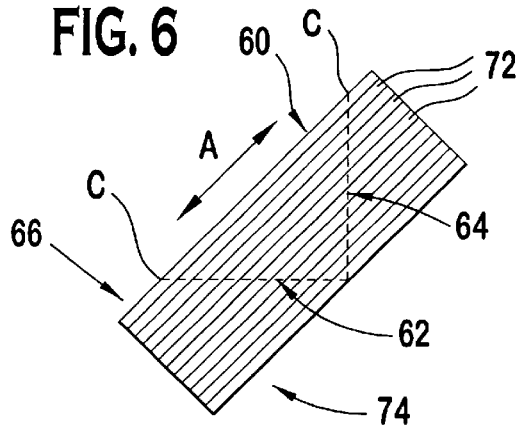
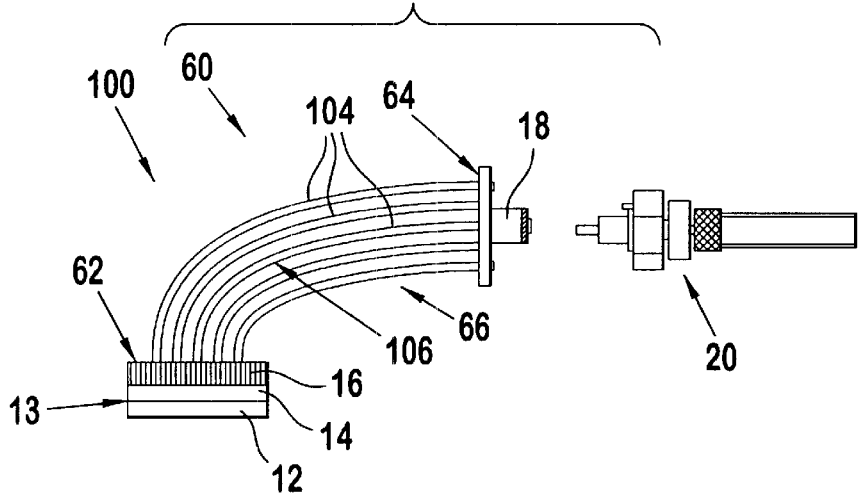
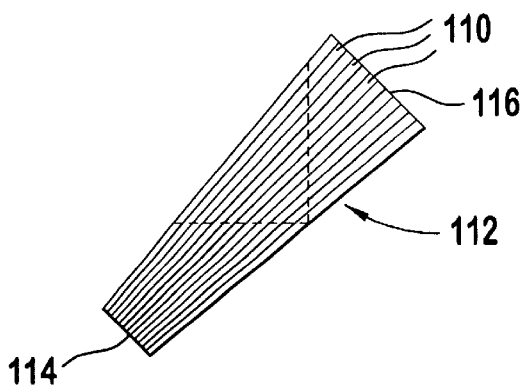

TRANSFORMING OPTICAL FIBER INTERCONNECT ARRAY

BACKGROUND

The present invention relates to a streamlined optical interconnection of an optical fiber to a data processing unit. More specifically, the present invention relates to an optical interconnection for interconnecting an optical fiber to an optical, electrical conversion device associated with a computer chip or the like.

Due to their ability to transmit large amounts of data, optical fibers are being used more frequently for data transmission. A single optical fiber or a bundle of fibers having connectors at each end are interconnected between two or more data processing units, for example, two integrated circuits. Referring to FIG. 1, a prior art interconnection with one of the data processing units 12 is shown. The data processing unit 12 can be any number of devices, for example an integrated circuit, or any other device electrically or magnetically transmitting and storing data, and typically has a flat profile for mounting on circuit board or the like (not shown). An optical, electrical conversion device 14 is positioned in alignment with the data processing unit 12. The active device 14 can be either an output device, for example, a VCSEL or LED, or a receiving device, for example, a CCD receiver. The active device 14 converts electrical signals to optical images and vice versa. A faceplate 16, typically manufactured from fused fibers, is positioned over the active device 14 to protect it. An adapter 18 is mounted on the faceplate 16 for receiving and securing the optical fiber connector 20. The connector 20 has a substantially rigid structure body 22 which receives and secures the optical fiber 26 for interconnection with the adapter 18. A jacket or packing 24 typically extends from the connector body 22 for protecting the optical fiber 26. An average connector 20 is approximately 30–40 mm long.

Referring to FIG. 2, it illustrates a stacking arrangement of two circuit boards utilizing the prior art interconnect structure of FIG. 1. Two data processing units 12, with their associated active devices 14, face plates 16 and adapters 18, are secured to the respective boards 10 in a generally horizontal orientation parallel to the board 10. The optical fiber connector 20 extends perpendicular to the board 10. Due to the length of the connector and the minimum bend radius of the optical fiber, substantial space, in relative terms, is required to accommodate this standard interconnect structure. For example, with a connector length of approximately 30–40 mm and an optical fiber bend radius of 25 mm, the boards require a spacing D of approximately 50 mm apart. While optical fibers provide enhanced data transmission, the fibers' physical limitations are often difficult to accommodate in ever shrinking, small electronic systems. In systems utilizing only electrical interconnects, the boards can be positioned approximately 20 mm apart, making the 50 mm spacing with the standard optical interconnect structure generally not acceptable.

Accordingly, there is a need for an optical interconnect structure which allows for streamlined interconnection while accommodating the optical fiber requirements.

SUMMARY

The present invention relates to an optical interconnection member for interconnecting at least one optical fiber with a data processing unit. The optical fiber is mounted in a connector having a generally linear axis and the data processing unit having a generally planar interface surface. The interconnection member comprises:

an optical, electrical conversion device mounted on the interface surface in operable alignment therewith;

an optical transformation array, having non-parallel input and output surfaces with an optical transmission medium therebetween, mounted relative to the optical, electrical conversion device such that one of its surfaces is in operable alignment therewith; and an adapter mounted relative to the other transformation array surface and in operable alignment therewith and adapted to receive the connector whereby the connector linear axis is non-perpendicular to the processing unit interface surface.

BRIEF DESCRIPTION OF THE DRAWING(S)

FIGS. 5 and 6 are schematic diagrams of a fiber optic bundle used in forming the optical transformation array of the first embodiment.

FIG. 7 is an elevational view of a second embodiment of the optical interconnect structure of the present invention.

FIG. 8 is a schematic of an alternative bundle arrangement for use informing the optical transformation array of the present invention.

DETAILED DESCRIPTION OF THE PREFERRED EMBODIMENTS

Figure 1:
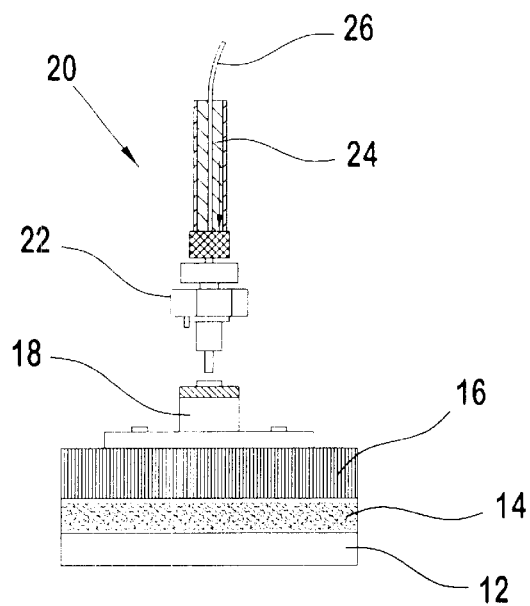
FIG. 1 is an elevational view of a prior art optical interconnect structure.
Figure 2:
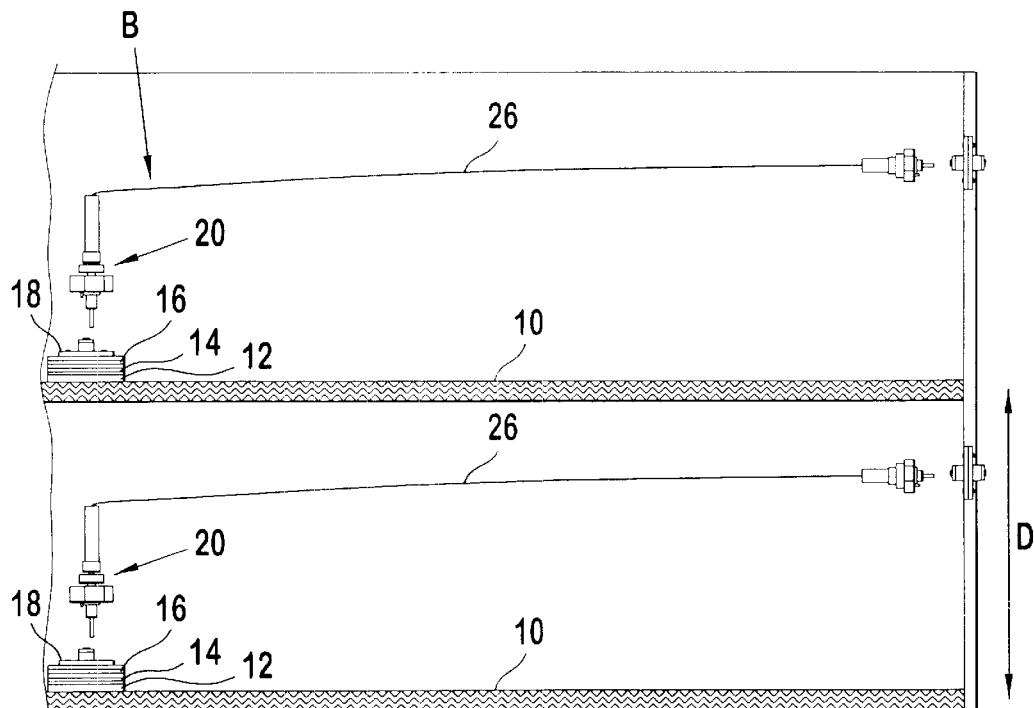
FIG. 2 is an elevational view of a prior art system including multiple circuit boards utilizing the prior art optical interconnect structures of FIG. 1.
Figure 3:
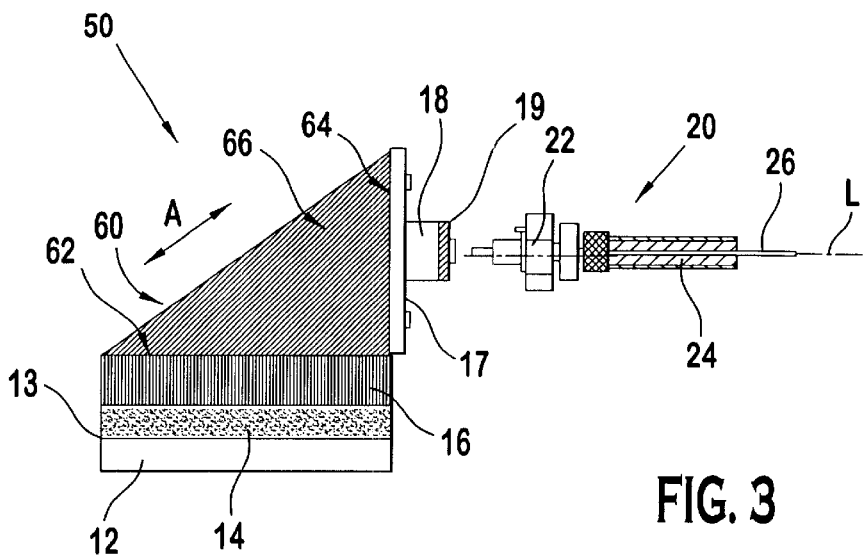
FIG. 3 is an elevational view of a first embodiment of the optical interconnection structure of the present invention.
Figure 4:
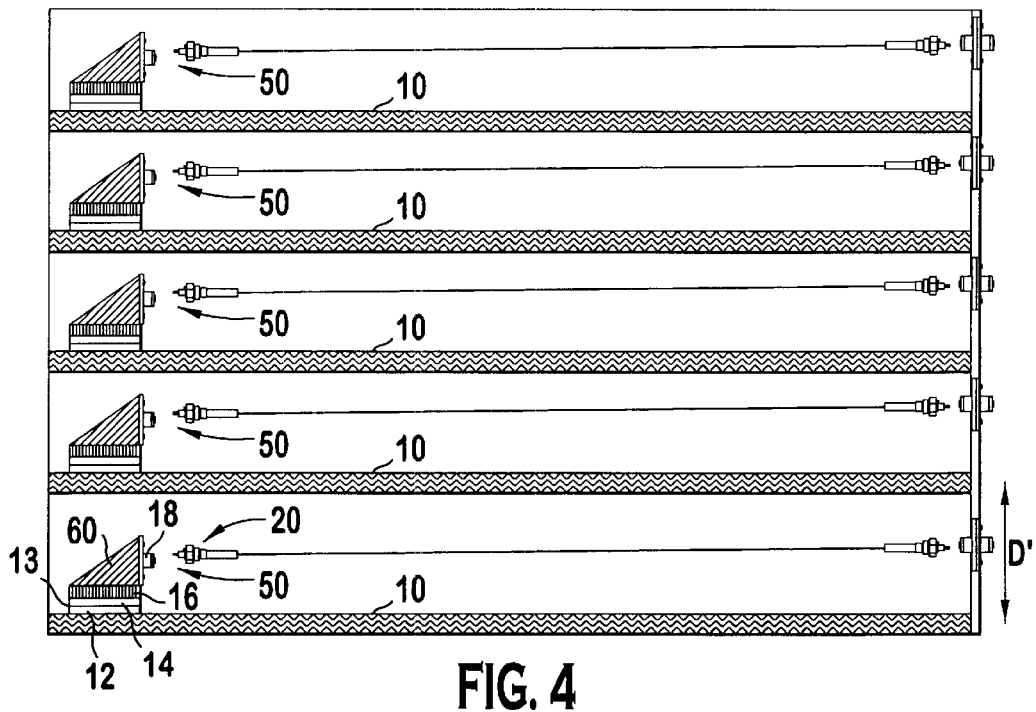
FIG. 4 is an elevational view of a system including multiple circuit boards utilizing the optical interconnect structures of the present invention.

Referring to FIGS. 3 and 4, a first embodiment of the preferred optical interconnection member 50 will be described. The interconnection member 50 provides a transformed optical path between the data processing unit 12 and one or more optical fibers 26. The optical fibers 26 preferably terminate in one or more connectors 20. Various connectors 20 can be used. Each connector 20 typically has a substantially rigid body 22 and a jacket or packing 24 which define a generally linear axis L for the optical fiber 26.

The interconnection member 50 includes an optical, electrical conversion device 14, and an adapter 18 with an optical transformation array 60 therebetween. The optical, electrical conversion device 14 mounts in operable alignment with the interface surface 13 of the data processing unit 12. The interface surface 13 is generally perpendicular to the board 10 upon which the processing unit 12 is mounted. The optical, electrical conversion device 14 converts electrical signals from the data processing unit 12 into optical signals for transmission over the optical fiber 26 and vice versa. The conversion device 14 may be an output device, for example, a VCSEL or an LED, or a receiving device, for example, a CCD. The conversion device 14 may also include portions for both output and receiving to facilitate two-way data transmission. A fiber optic faceplate 16 may be placed over the conversion device 14 to provide protection thereto. However, as will be described hereinafter, the faceplate 16 may not be required.

The adapter 18 generally has a mounting surface 17 and a receiving body 19 extending therefrom. The receiving body 19 is configured to receive the connector 20 and maintain the optical fiber 26 in operable alignment with the optical transformation array 60.

Referring to FIG. 3, the optical transformation array 60 has non-parallel input and output surfaces 62 and 64 with an optical transmission medium 66 therebetween. Each surface 62, 64 facilitates either input or output depending on the direction of transmission. In the preferred embodiment, the surfaces 62 and 64 are perpendicular to one another, however, the surfaces 62 and 64 can be at any desired angle relative to one another depending on the desired connector/processing unit configuration. Referring to FIG. 4, it can be seen that the preferred angle of 90° allows the connector 20 to extend with its axis L parallel to the processing unit interface surface 13, thereby minimizing the space required for the interconnection. As a result, the circuit boards 10 can be stacked at a reduced distance D'. Preferably, the distance D' is in the range of pure electrical interconnections, i.e. 20 mm.

Referring to FIGS. 5 and 6, the optical transmission medium 66 of the first embodiment will be described. The transmission medium 66 is preferably manufactured in a manner similar to a faceplate. A plurality of optical fibers 72 are bundled together and then fused to form a resultant boule 74, a block of fused fibers 72 oriented in the direction of axis A, which will serve as the transmission medium 66. To form the transformation array 60, the boule 74 is cut along lines C in FIG. 6, with the cut surfaces defining the input and output surfaces 62 and 64. The surfaces 62 and 64 may be cleaned and polished or otherwise finished as desired. The cuts C are made relative to one another such that the surfaces 62 and 64 will have the desired orientation relative to one another and the fiber orientation axis A will extend between the two surfaces 62 and 64. The finished transformation array 60 is ready for mounting between the adapter 18 and either a faceplate 16 or directly to the conversion device 14. Since the transformation array 60 has a rigid structure similar to the faceplate 16, use of a faceplate will generally be unnecessary, thereby further reducing the space which, referring to FIG. 3, the interconnection member 50 occupies.

Referring to FIG. 7, a second embodiment of the interconnection member 100 is shown. The interconnection member 100 includes a conversion device 14 and an adapter 18 with a transformation array 60 therebetween. However, in this embodiment, the transformation array transmission medium 66 is defined by a bundle 106 of bent optical fibers 104, as opposed to the angle cut fibers of the previous embodiment, with the ends of the bundle 106 defining the input and output surfaces 62 and 64. The fibers 104 may be formed into a boule and then bent by heating the boule and bending the fibers 104 while hot. The end surfaces 62 and 64 can then be finished and the transformation array 60 is ready for use. Alternatively, a leaching process may be utilized with a resultant single bundle 106 of fibers with rigid coherent ends and a flexible middle. In such an embodiment, the adapter 18 may be attached to the board for maintained positioning.

Referring to FIG. 8, in addition to the change in angular direction of the signal, the transformation array 60 can provide other desired changes in the optical signal. As shown in FIG. 8, the fiber bundle 112 can be tapered between its ends 114 and 116 before the transformation array 60 is defined, for example by angle cutting, as illustrated in FIG. 8, or bending or leaching. Tapering of the bundle 112 increases or decreases the pitch of the source thereby allowing, referring to FIG. 3, the transformation array 60 to magnify or demagnify a signal in addition to changing the direction. Referring to FIG. 8, the fibers 110 can be twisted, if desired, to change the signal alignment. If both pitch and alignment changes are desired, the fibers 110 can be both twisted and tapered. The angle, or bend radius, and the taper can be adjusted to control the angle of the light cone on the output surface 62, 64.

In each of the embodiments, the fiber arrays are preferably manufactured from a multi-component class. However, plastics or other materials may also be used.

What is claimed is:

1. An optical interconnection member for interconnecting at least one optical fiber with a data processing unit, the optical fiber mounted in a connecter having a generally linear axis and the data processing unit having a generally planar interface surface, the interconnection member comprising:

an optical, electrical conversion device mounted on the interface surface in operable alignment therewith;

an optical transformation array formed of fused parallel fibers having non-parallel input and output surfaces the fibers being at an angle of less than 90 degrees with respect to the input and output surfaces, mounted relative to the optical, electrical conversion device such that one of its surfaces is in operable alignment therewith; and an adapter mounted relative to the other transformation array surface and in operable alignment therewith and adapted to receive the connecter whereby the connecter linear axis is non-perpendicular to the processing unit interface surface.

2. The optical interconnection member of claim 1 wherein the input and output surfaces are perpendicular to one another.

3. The optical interconnection member of claim 1 wherein the optical, electrical conversion device is an input device.

4. The optical interconnection member of claim 1 wherein the optical, electrical conversion device is an output device.

5. The optical interconnection member of claim 1 wherein the optical, electrical conversion device facilitates both input and output.

6. The optical interconnection member of claim 1 wherein the optical, electrical conversion device is a VCSEL array.

7. The optical interconnection member of claim 1 wherein the optical, electrical conversion device is a LED device.

8. The optical interconnection member of claim 1 wherein a faceplate is positioned between the optical, electrical conversion device and the optical transformation array.

9. The optical interconnection member of claim 1 wherein the optical transformation array comprises a bundle of fused fibers having first and second ends and a linear fiber axis therebetween, at least one of the ends being non-perpendicular relative to the fiber axis.

10. The optical interconnection member of claim 9 wherein both bundle ends are non-perpendicular relative to the fiber axis.

11. The optical interconnection member of claim 9 wherein the bundle is tapered toward one of its ends.

12. The optical interconnection member of claim 9 wherein the fibers are multi-component glass.

13. The optical interconnection member of claim 9 wherein the fibers are plastic.

* * * * *